United States Patent [19]

Jacobs

[11] Patent Number: 5,029,891
[45] Date of Patent: Jul. 9, 1991

[54] INFANT STROLLER

[75] Inventor: Richard J. Jacobs, Roseville, Minn.

[73] Assignee: Tri Industries, Inc., Hopkins, Minn.

[21] Appl. No.: 508,084

[22] Filed: Apr. 11, 1990

[51] Int. Cl.$^5$ .............................................. B62B 7/06
[52] U.S. Cl. ................................ 280/650; 280/47.38; 280/62; 280/658
[58] Field of Search ............... 280/1.5, 644, 642, 647, 280/47.38, 650, 658, 62

[56] References Cited

U.S. PATENT DOCUMENTS

| | | | |
|---|---|---|---|
| Des. 204,254 | 4/1966 | Cerf | D14/14 |
| Des. 206,116 | 11/1966 | Hughes | D14/3 |
| Des. 274,714 | 7/1984 | Cone | D12/129 |
| Des. 297,525 | 9/1988 | Baechler | D12/129 |
| 699,186 | 5/1902 | Katzke | 280/42 |
| 716,972 | 12/1902 | Whitmore et al. | 280/643 |
| 2,455,119 | 11/1948 | Hall | 280/644 |
| 2,781,225 | 2/1957 | Heideman | 280/642 |
| 3,052,480 | 9/1962 | Sanstrom | 280/6 |
| 3,305,244 | 2/1967 | Flagg | 280/47.35 |
| 3,403,744 | 10/1968 | Dinkel | 180/25 |
| 3,575,461 | 4/1971 | Goldman | 280/47.38 |
| 3,605,929 | 9/1971 | Rolland | 180/26 |
| 3,656,777 | 4/1972 | Keiser, Jr. | 280/87.043 |
| 3,698,502 | 10/1972 | Patin | 280/111 |
| 3,712,636 | 1/1973 | Gesslein | 280/47.38 |
| 3,781,031 | 12/1973 | Patin | 280/62 |
| 3,873,116 | 3/1975 | Perego | 280/650 |
| 3,909,043 | 9/1975 | Black | 280/269 |
| 4,029,329 | 6/1977 | Chambers | 280/272 |
| 4,064,957 | 12/1977 | Parham | 180/27 |
| 4,072,318 | 2/1978 | Laune | 280/42 |
| 4,166,630 | 9/1979 | Sullivan et al. | 280/7.1 |
| 4,181,317 | 1/1980 | Toda | 280/42 |
| 4,325,449 | 4/1982 | D'Addio et al. | 280/282 |
| 4,335,900 | 6/1982 | Fleischer | 280/649 |
| 4,346,912 | 8/1982 | Habib . | |
| 4,353,567 | 10/1982 | Weldy | 280/92 |
| 4,361,338 | 11/1982 | Kuchenbecker et al. | 280/259 |
| 4,369,987 | 1/1983 | Witherell | 280/79.2 |
| 4,373,740 | 2/1983 | Hendrix | 280/269 |
| 4,403,673 | 9/1983 | Ball | 180/214 |
| 4,408,776 | 10/1983 | Randolph et al. | 280/261 |
| 4,422,663 | 12/1983 | Hon | 280/278 |
| 4,526,390 | 7/1985 | Skolnik | 280/62 |
| 4,618,184 | 10/1986 | Harvey | 297/19 |
| 4,902,027 | 2/1990 | Skelly | 280/7.1 |
| 4,934,728 | 6/1990 | Chen | 280/650 |
| 4,953,880 | 9/1990 | Sudakoff et al. | 280/658 |

FOREIGN PATENT DOCUMENTS

| | | | |
|---|---|---|---|
| 213538 | 9/1909 | Fed. Rep. of Germany . | |
| 2348716 | 7/1974 | Fed. Rep. of Germany | 280/642 |
| 2741543 | 6/1978 | Fed. Rep. of Germany . | |
| 2579544 | 10/1986 | France . | |
| 851163 | 10/1960 | United Kingdom | 280/658 |
| 2209765A | 12/1982 | United Kingdom . | |
| 2204282A | 11/1988 | United Kingdom . | |

OTHER PUBLICATIONS

Page 69-Les Ateliers Etablissement Public a Caractere Industriel et Commercial (French Publication).

Primary Examiner—Andres Kashnikow
Assistant Examiner—Eric Culbreth
Attorney, Agent, or Firm—Paul L. Sjoquist

[57] ABSTRACT

A lightweight infant stroller is provided for carrying an infant while walking or while walking, running or jogging at a faster than walking pace. The stroller includes three large diameter wheels arranged in a tricycle configuration, a lightweight foldable frame to which the wheels are attached and an infant holder made from a flexible material supported by the frame. The frame includes pivotally connected upper portion and a lower portions, whereby the portions may be folded against one another so the stroller occupies a minimum space during transport or storage. The rear wheels are removably attached to the frame; they may be removed completely for storage and, for use, the distance between the rear wheels may be selectively varied to enhance stability.

11 Claims, 5 Drawing Sheets

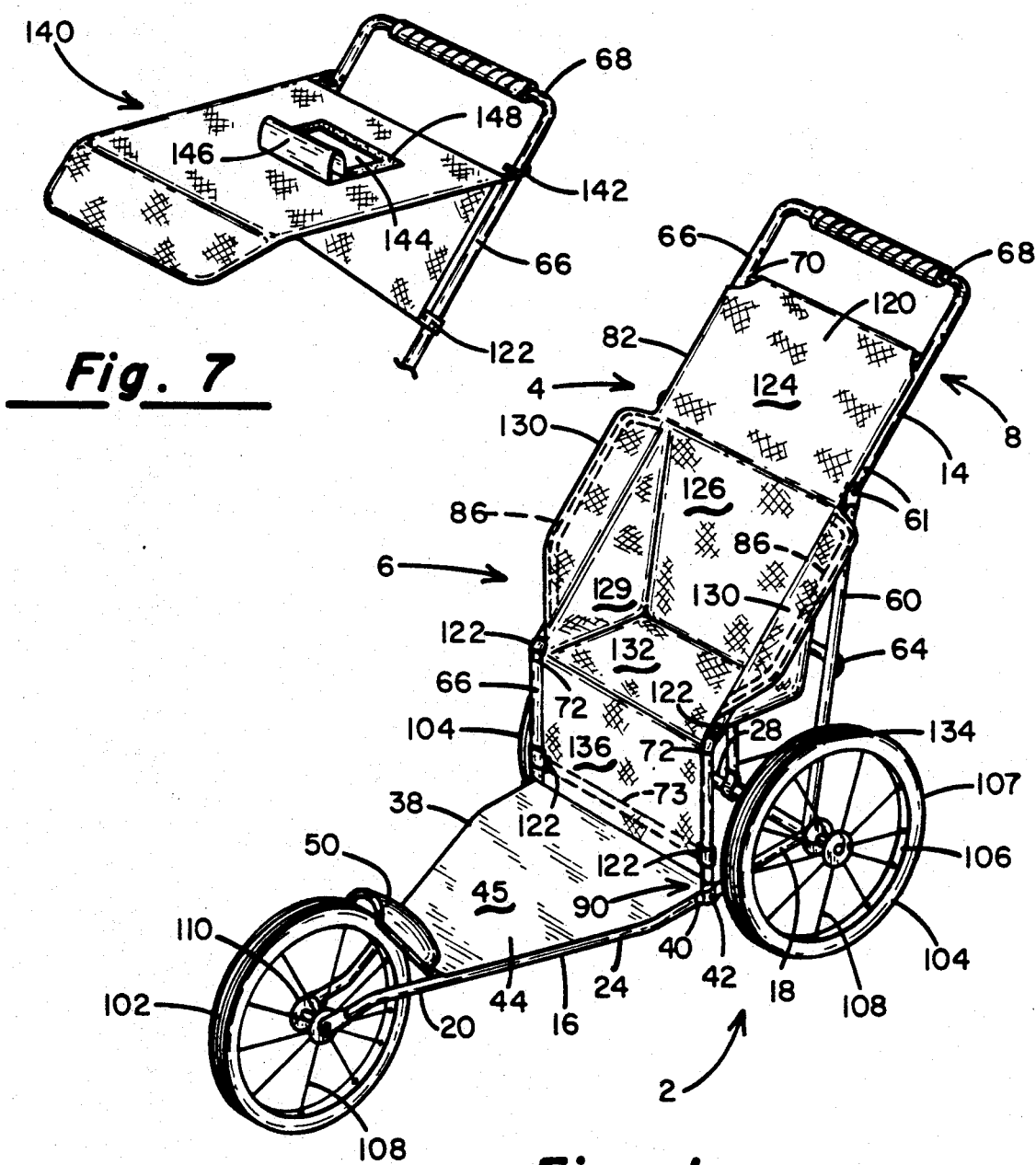

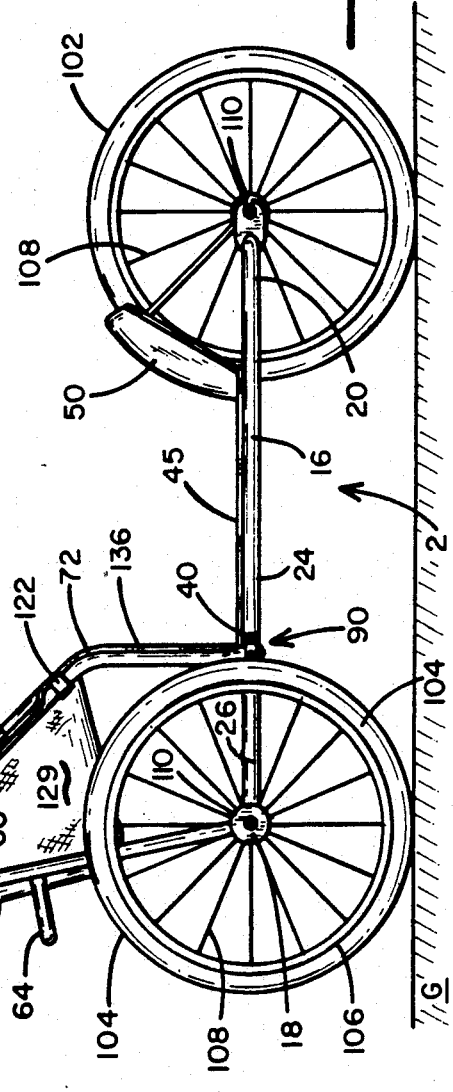

INFANT STROLLER

BACKGROUND OF THE INVENTION

This invention relates generally to infant carriers or strollers and, more particularly, to an infant stroller having a foldable frame for convenient transport and storage of the stroller. The stroller frame provides sufficient stability so that the stroller may be used to carry an infant at a relatively higher speed than usual average walking speed (3-4 miles per hour).

U.S. Pat. Nos. 699,186 and 716,972 show that collapsible baby carriages have long been known. These early carriages have evolved and numerous improvements have been made. Refinements are shown in U.S. Pat. Nos. 3,873,116; 4,072,318; 4,181,317; and 4,335,900. The latter patent particularly discusses the need for a baby carriage which may be conveniently stored.

While the above-noted prior art discloses advances and refinements in the art of infant carriers for efficient storage thereof, it appears that scant attention has been devoted to the resurgent interest in physical fitness and to strollers for use by participants in activities that promote fitness. In recent years, persons of all ages, including the parents of infants and young children, have developed great interest in all forms of physical exercise, particularly in jogging or walking at relatively high speeds.

What is needed by these active persons is an infant stroller providing both for the safe secure carrying of a baby while moving at a relatively higher speed than a normal walking pace and for the convenient, efficient transport and storage of the stroller. U.S. Pat. No. 297,525 appears to address the former need yet there is no suggestion therein of how to accomplish the latter.

SUMMARY OF THE INVENTION

The infant stroller of the present invention is directed to and in large part solves the aforementioned problems of providing for the safe, secure transport of an infant at a relatively high speed and the need for occupying storage and transport space efficiently.

Specifically, the present invention provides an infant stroller with an uncomplicated foldable frame which may be quickly and easily manipulated to occupy a minimal amount of space for transport and storage and which may be quickly and easily erected to provide safe, stable and secure support for an infant. Large diameter wheels are attached to the frame so that, at the relatively higher speeds at which the stroller may be used, the ride will be made as smooth as possible. Additionally, the rear wheels are detachably mounted on the frame so that, when collapsed for transport or storage, the stroller will occupy a minimum of valuable storage space.

A particular advantage of the infant stroller of the present invention is that the stroller enhances the stability and safety of a child carried therein even at relatively higher speeds than normal walking pace on a variety of surfaces.

It is an object of the present invention to provide a lightweight, easily maneuverable and transportable infant stroller.

It is another object of the present invention to provide an infant stroller wherein the transverse wheel base or the distance between the rear wheels is variable to achieve optimum stability on various surfaces.

A feature of the present invention is a split rear axle comprising two stub axles slidably received in a bottom frame crossmember wherein the stub axles and the crossmember have a plurality of apertures extending therealong. The stub axles may be secured in the frame crossmember to provide a selected width between the rear wheels attached to the outer ends of the stub axles.

The infant stroller of the present invention features a generally tubular frame having relatively few framing members and joints therebetween, yet sufficiently rigid to provide adequate support for older infants and to withstand the loading imposed by turning, rough ground surfaces and the higher than walking speeds at which the stroller may be used.

It is an object of the present invention to provide an infant stroller having an erectable and collapsible frame that can be simply and easily manipulated into its erected and its collapsed state wherein when erected the frame provides support for an infant and when collapsed the frame is easily transportable and occupies a minimum amount of valuable storage or transport space.

It is another object of the present invention to provide an infant stroller which occupies a minimum amount of storage and transport space whereby a feature of the present invention is a split rear axle enabling the rear wheels to be removed easily for transport and storage and yet securely locked in place for use.

Other features of the present invention include a frame which has frame members that may be attached to one another without using tools; the frame members are joined and the axles secured to the frame by removable, lockable spring-biased pins. The frame for the present invention includes a low central 360° pivot at the level at which the upper frame portion is joined to the lower frame portion. The outside of the back or rear of the stroller and the outside bottom of the stroller facing the ground surface may be brought together around the pivot, everting the area where the infant is carried and folding the upper frame portion against the lower frame portion. Thus, the folded stroller occupies a minimal amount of space while being transported or stored.

It is a particular advantage of the infant stroller of the present invention that it occupies a minimal amount of space during storage and transport.

Another particular advantage of the infant stroller of the present invention is that it provides maximum stability and safety by including a transverse rear wheel base which may be varied from a wide wheel base for running to a narrower wheel base for walking.

Yet another feature of the present invention is a draped, cloth-like flexible infant holding seat having safety fenders or armrests, wherein the seat is supported by the frame for carrying and protecting various size infants safely and securely therein and yet may be removed conviently and easily for cleaning.

Further objects, features and advantageous of the present invention will be understood with reference to the following specification, the appended drawings and claims.

BRIEF DESCRIPTION OF THE DRAWINGS

FIG. 1 is a perspective view of the stroller of the present invention.

FIG. 2 is side elevational view of the stroller.

FIG. 5 is a top plan view of the stroller of the present invention.

FIG. 7 is a partial perspective view showing an optional feature for use with the stroller of the present invention.

DESCRIPTION OF THE PREFERRED EMBODIMENT

Figure 6:
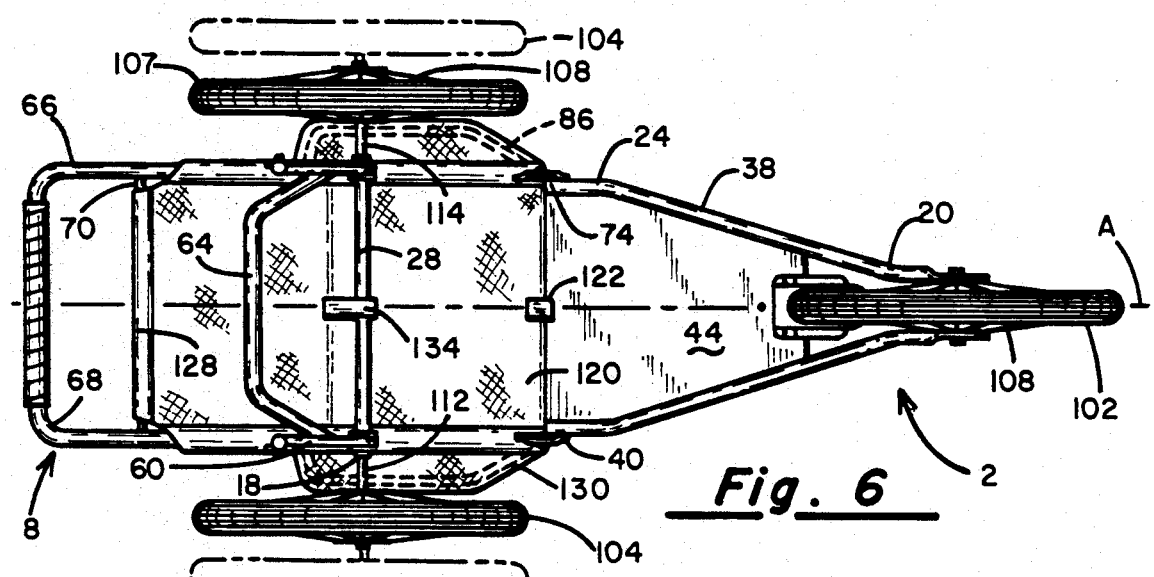
FIG. 6 is a bottom plan view of the stroller, including line A representing the central longitudinal axis of the stroller.

The infant stroller of the present invention is indicated in general by numeral 2 in FIGS. 1-6. The stroller 2 has a frame 4, seating area 6, a handle portion 8 and wheels 102, 104.

FIGS. 1 and 2 show that the frame 4 comprises a bifurcated structure having an upper frame portion 14 and a lower frame portion 16.

The lower frame portion 16 is generally planar and, when in use, will be generally parallel to the ground G as shown in FIG. 2. The lower frame portion 16 has a rear end 18, a front end 20 and a central longitudinal axis represented by line A in FIG. 6.

Continuous side rails 24 comprise a primary structural element of the lower frame portion 16. The side rails 24 have a rear parallel section 26 and, near the end of the rails 24 in the parallel section 26, a lower crossmember 28 connects the rails 24. The lower crossmember 28 is generally tubular, has open ends 30 and a plurality of spaced, in-line apertures 34 along its length.

In the medial section 38 of the lower frame portion 16, the side rails 24 taper toward one another and inwardly toward the central longitudinal axis A, forming a generally triangularly shaped area. On the lateral and outer side of the rails 24 brackets 40 having apertures 42 are provided. The purpose of the brackets 40 will be explained hereinbelow. The medial section 38 includes a floor plate 44. The floor plate 44 is a planar, generally rigid piece of material. The upper surface 45 of the plate may be corrugated. Alternatively, the upper surface 45 may be coated with a suitable rubberized or plastic material (not shown) to provide a non-slip surface.

Forwardly toward front end 20, the lower frame portion 16 has a fork section 46. In this section 46, the rails 24 become parallel again and are much closer to one another than in the parallel section 26. The front ends of the side rails 24 are provided with mounts 48 for receiving the axle of the wheel 102. The mounts 48 may be the type of mounts typically found on lightweight touring bicycles known as drop-outs and may be secured to the ends of the rails 24 by appropriate means such as welding.

Attached near the fork section 46, the stroller 2 may be provided with a fender 50 to prevent water or surface material from being thrown upwardly during use. The fender 50 may be attached either to the side rails 24 or to the floor plate 44 by appropriate means such as typical nut and bolt fasteners or riveting.

The frame 4 of the stroller 2 also includes an upper portion 14. The upper portion 14 is relatively vertical with regard to lower frame portion 16 and includes generally vertical rear uprights 60. The uprights 60 may be angled from the normal relative to the lower frame portion 16 in the direction of the stroller frame rear end 18. Approximately half way up the uprights 60 from the lower frame portion 16, the uprights have a rear upper cross-brace 64 attached thereto. The cross-brace 64 may extend generally in the same plane as the uprights 60 or, as shown, it may be bowed.

The upper frame portion 14 includes a handle and seat supporting frame member 66. The supporting frame member 66 is generally U-shaped, having a handle crossmember 68 forming the base of the U. The handle crossmember 68 is generally horizontal and parallel to the ground. Moving downwardly along the supporting frame member 66 toward the lower frame portion 16, the frame member 66 is provided with a seat bar 70. The bar 70 is fixed to the supporting frame member 66, extending therebetween and generally perpendicular to the legs of the U-shaped frame member 66.

The frame member 66 has bent area 72 and terminates in free ends 74. Just upwardly from free ends 74, a cross-bar 73 is provided to further rigidify the supporting frame member 66 and to insure that the free ends 74 remain in proper alignment. The portion of the supporting frame member 66 between the bent area 72 and the free ends 74 is generally normal to the lower frame portion 16. The free ends 74 are formed as flattened tongues having apertures 80 therethrough.

At approximately the midpoint 82 of the supporting frame member 66, the rear uprights 60 are pivotally connected to the supporting frame member 66. The connection may be secured by typical fastening means, such as a nut and bolt arrangement, extending through apertures 61.

As shown in FIGS. 1 and 2, there may be more than one aperture 61 per side of the frame member 66, one located above the other. It should be appreciated that securing the uprights 60 to the lower aperture 61 (as shown) will cause the handle crossmember 68 to be higher relative to the ground. Thus, the height of the handle crossmember 68 may be made comfortable for the person pushing the stroller 2.

Between the approximate midpoint 82 and the bent area 72 of the supporting frame member 66, safety wing supports or guard brackets 86 are provided.

Figure 8:
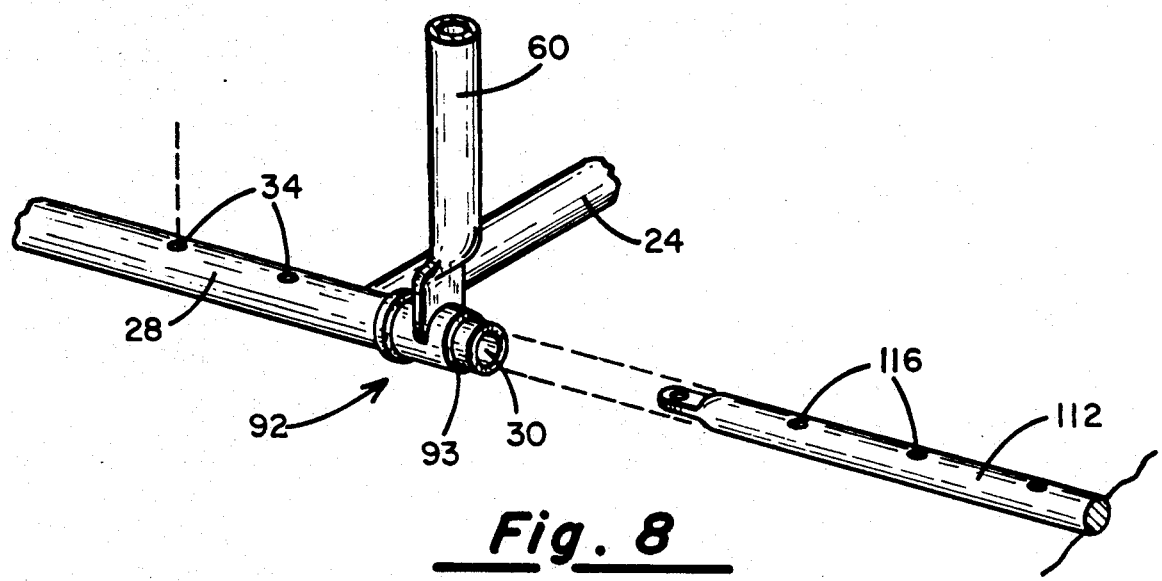
FIG. 8 is a broken out partial section showing the details of a portion of the frame and a rear stub axle of the stroller of the present invention.
Figure 9:
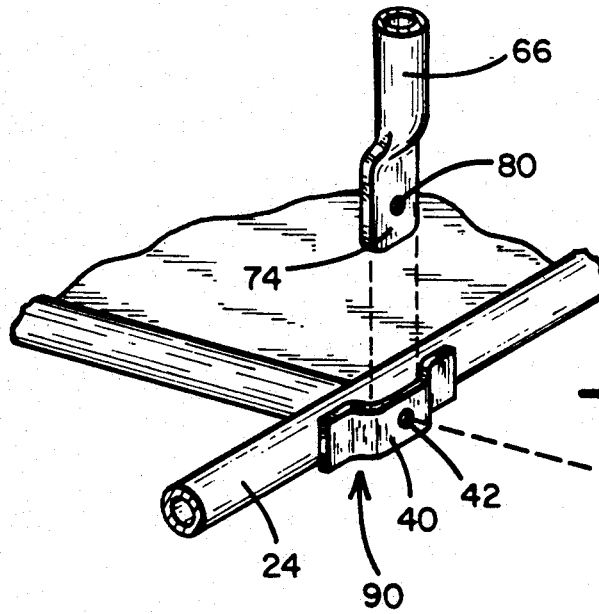
FIG. 9 is a broken out partial section showing a detail of the frame of the stroller.

FIGS. 8 and 9 provide additional detail with regard to the attachment points between the lower frame portion 16 and the upper frame portion 14. The front attachment points, indicated at 90, are provided by brackets 40 which receive the tongues formed at ends 74. The apertures 42, 80 may be aligned and the ends 74 may be secured in brackets 40 by appropriate methods, including a spring-loaded, lockable safety pin (not shown) or typical nut-and-bolt fastening means. The rear attachment points, indicated at 92, comprise an anti-friction journal/shaft arrangement made up of the lower crossmember 28 and the uprights 60. A bushing 93 may be provided to insure the smooth pivotal connection at the rear attachment points 92 for the purpose explained hereinbelow.

FIGS. 1, 2 and 6 show further detail regarding the wheels 102, 104 for the stroller 2. The wheels include a single front wheel 102 and two spaced rear wheels 104. The wheels 102, 104 have a relatively large diameter, approximately 16-24 inches. The wheels 102, 104 may be typical bicycle-type wheels comprising a rim 106 upon which are mounted inflatable or tube-type tires 107. Spokes 108 are attached between the rim 106 and the hubs 110 of the wheels 102, 104.

The hub 110 of the front wheel 102 is removably received in the mounts 48 of the lower frame portion 16.

Figures 3, 4:
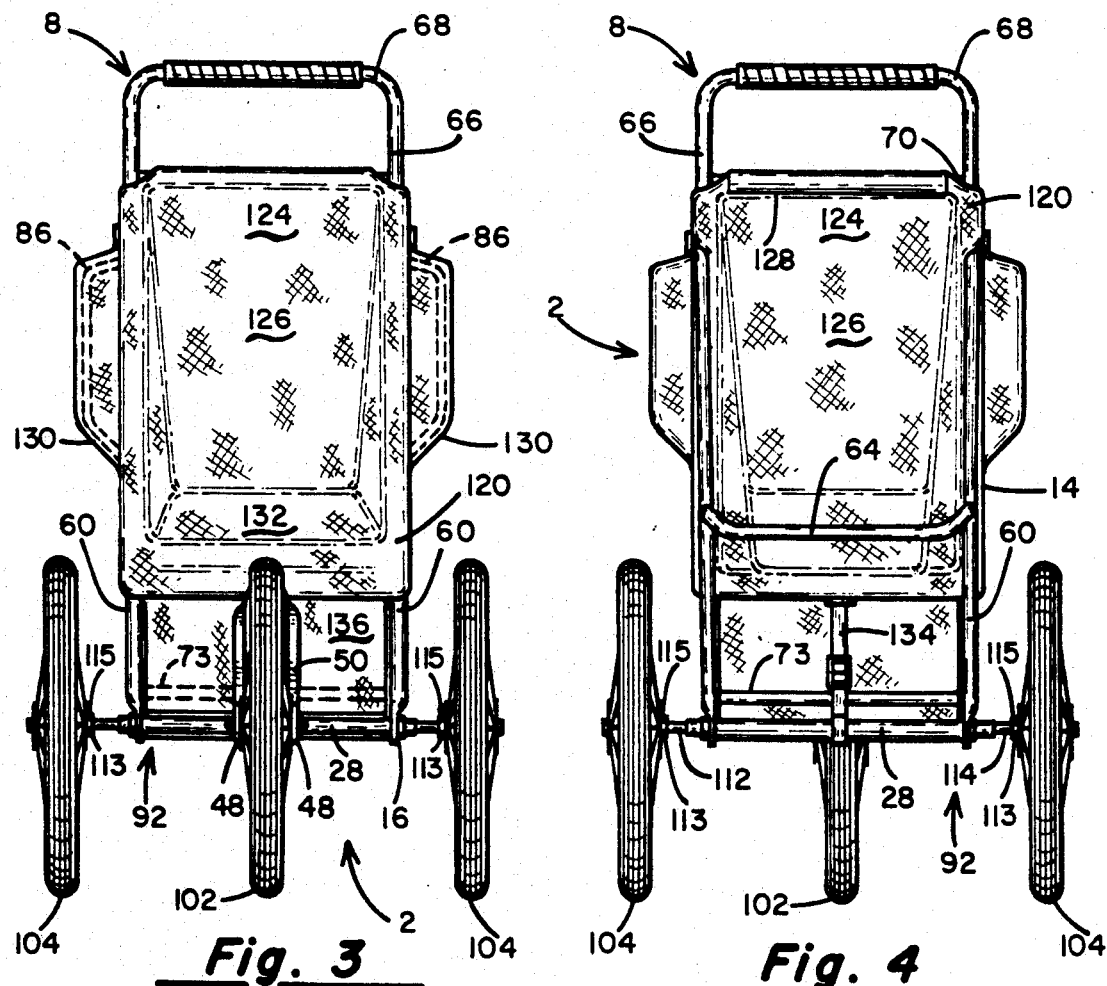
FIG. 3 is a front elevational view of the stroller.
FIG. 4 is a rear elevational view of the stroller.

The rear wheels 104, and the hubs 110 thereof, are rotatably mounted on a pair of stub axles 112, 114. The wheels 104 and the bearings (not shown) therefore are held in place on the axles 112, 114 by a shoulder 113. The stub axles 112, 114 are received in the tubular lower crossmember 28 as shown in FIG. 8. That figure also shows that the stub axles 112, 114 have a plurality of through apertures 116. These apertures 116 may be aligned with the apertures 34 in the lower crossmember 28 so that the stub axles may be secured in the crossmember 28 at selected distances relative to one another as shown in FIG. 6. To aid in aligning the apertures 34, 116, near the ends of the stub axles 112, 114 where the wheels 102, 104 are mounted, the axles 112, 114 are provided with indicators 115 (FIGS. 3 and 4). The indicators 115 may be on the shoulders 113 as shown, directly on the axles 112, 114 or on both.

It should be appreciated that the combination of the stub axles 112, 114, the lower crossmember 28 and the securing means, which may be typical spring biased pin or commercially available bolt and nut-type fasteners (not shown), provide for the lateral or transverse adjustment of the rear wheel base or the distance between the rear wheels 104 relative to one another and to the central longitudinal axis A. This combination also provides for the complete removal of the wheels 104 and stub axles 112, 114 for storage of or transporting the stroller 2.

Although not shown, it should be appreciated that a braking system may be provided on the stroller 2 of the present invention. For example, caliper or cantilever brakes may be mounted on the frame 4 for controlling the rotary motion of the wheels 102, 104. Also, a releasable strap arrangement (not shown) attached to the frame 4 and extending through one or more of the wheels 102, 104 may be provided for use as a parking brake. This strap arrangement may also be used to secure the frame 4 in its folded position as shown in FIGS. 10e and 10f.

FIGS. 1-5 provide additional detail regarding the seating area or infant holder 6 of the stroller 2. The seating area 6 comprises a flexible, soft, fabric-like material 120. A plurality of securing straps 122 are permanently or removably affixed to the material 120 so that the seating area 6 may be secured to the frame 4. The material 120 is draped or positioned over the upper frame portion 14 and may extend over or touch lower frame portion 16 and the plate 44 as well. The top 124 of the back rest 126 of the seating area 6 is attached to the seat bar 70 by a Velcro ® fastening strip 128; however, it may be sewn in place or otherwise attached as well.

The seating area 6 also has sidewalls 129 and, attached to the sidewalls 129 safety wings or arm rests 130. The safety wings 130 comprise pockets which fit over the safety wing supports 86 attached to the supporting frame member 66 and are provided to prevent a child carried in the stroller 2 from contacting or grabbing the wheels 104 while the stroller 2 is in use.

A seat 132 receives the child's bottom. The seat 1 is generally deep and low relative to the frame 4 thereby providing a low center of gravity for the stroller while carrying an infant. That is, it is close to and generally forwardly above the lower crossmember 28 and the stub axles 112, 114 therein. A strap 134 extends from the outside of the seat 132 to the lower crossmember 28 to hold the seat 132 in place.

A kick flap 136, depending from the seat 132 is provided to prevent a child's feet or legs from getting beneath the seat 132. Although it is not shown, the kick flap 136 may extend forwardly onto plate 44 or it may be secured to the rearward edge of plate 44.

A rear accessory pocket 138 may be provided on the outside of back rest 126. Additionally, as shown in FIG. 7, a removable sunshade or awning 140 formed of the same material 120 making up the seating area 6 may be provided. The sunshade 140 is detachable and supported on a rod-like support 142 removably connected to the upper frame support member 66 just below the handle 68. The sunshade 140 may be provided with an access port 144 which can be closed by a flap 146 secured in place by Velcro ® strip 148.

The above set forth and identified structure of the stroller 2 accomplishes the previously stated objects and provides significant advantages. FIG. 1 shows the stroller 2 set up and ready to carry an infant at a walking speed or a higher than average walking speed. The seating area 6 is soft and, since the material 120 is generally draped over portions of the frame 4, presents relatively few hard surfaces which may contact an infant while the stroller is being used minimizing or avoiding possible injury to the infant. The seating area 6 is a hammock-like area for holding the infant. The combination of the safety wings 130 and supports therefore prevent an infant from contacting the wheels 102, 104 while the stroller 2 is in motion; likewise, the kick flap 136 minimizes the chances that an infant's toes or feet will contact the ground surface G or the wheels 102, 104 while the stroller 2 is in motion.

The large diameter wheels 102, 104 and the tricycle configuration in which they are mounted provide maximum stability and maneuverability. The large diameter of the wheels 102, 104 provides for a smoother ride than the typical small diameter wheels found on strollers, particularly when the stroller 2 is being used while running or jogging.

The location of the seating area 6 relative to the frame 4 and to the wheels 102, 104 provides significantly improved stability because the center of gravity is located low relative to the ground 9 and forward of the crossmember 28. The front wheel 102 may be easily maneuvered for turning and for traveling up and down over curbs or steps.

Additionally, the rear stub axles 112, 114 are selectively and removably received or positioned in the lower crossmember 28. Thus, the rear wheel width may be selected (as shown in FIG. 6) to provide maximum stability depending upon the ground surface upon which the stroller 2 is being used. For example, on a rustic hiking or walking trail, the position of the rear wheels 104 shown in phantom in FIG. 6 might be selected to provide maximum stability. Conversely, on a smooth hard surface such as a sidewalk or an asphalt path the position in which the rear wheels 104 are closer together may be selected. The closest selectable position of the rear wheels 104 will facilitate moving the stroller 2 through doorways, turnstiles or other entrance-ways commonly found in public areas.

A significant and commercially important advantage provided by the stroller 2 is that it provides for the safe, secure carrying of infants at walking speeds and at running or jogging speeds even when the ground surface may vary.

Figure 10A:
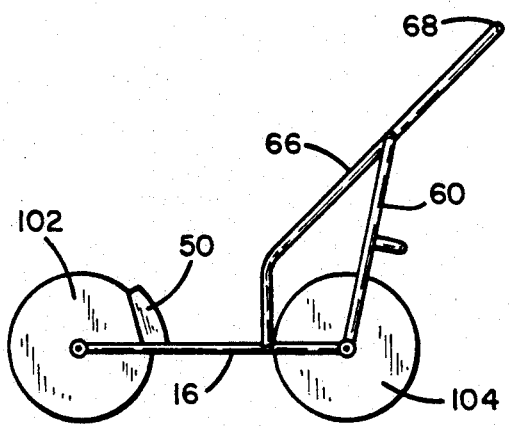
FIG. 10a-f is a schematic representation of the manipulation of the frame of the stroller from its position for use shown in 10a to its position for storage shown in 10f.
Figure 10D:
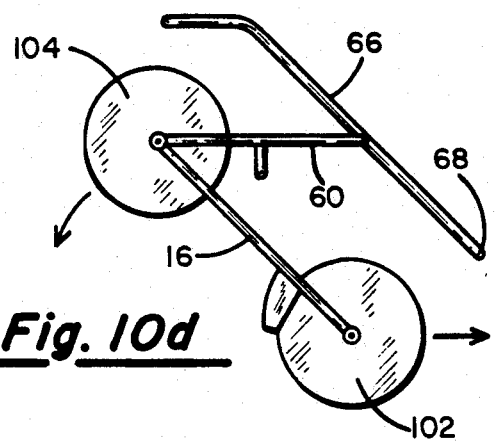
Figure 10B:
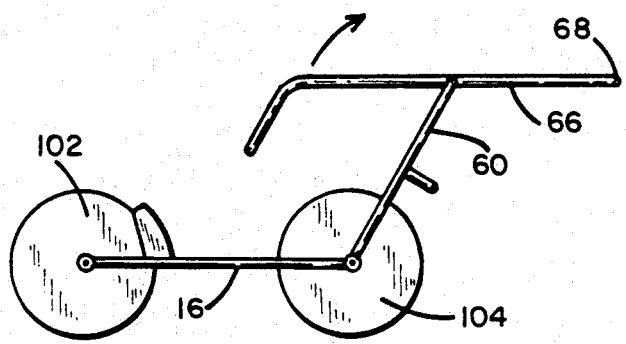
Figure 10E:
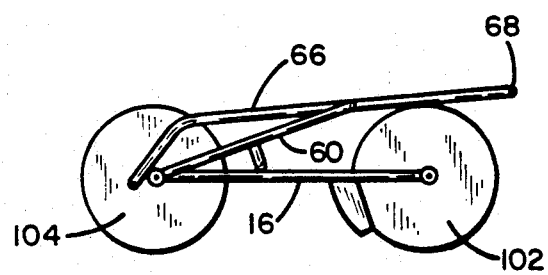
Figure 10C:
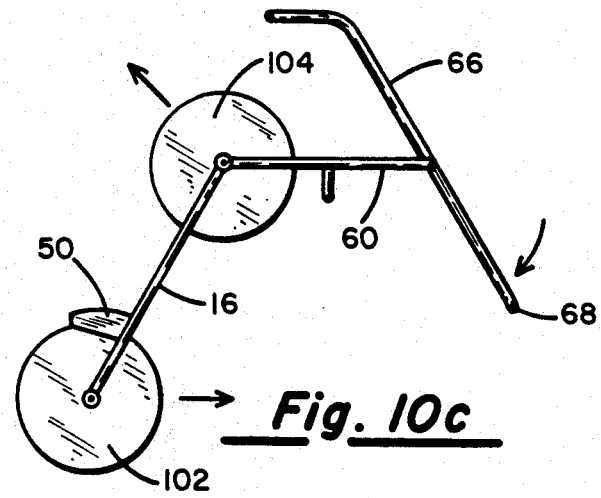
Figure 10F:
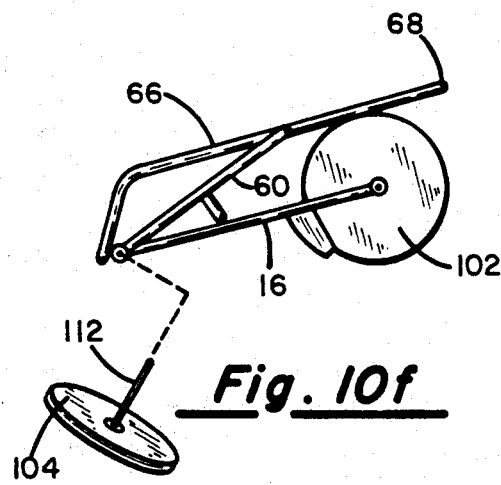

FIGS. 10a-f show that the stroller 2 accomplishes another object of the present invention, that is, the use of minimal storage and transport space as well as the quick, easy and convenient manipulation of the frame 4 of the stroller 2 for use or for transport or storage. FIG. 10a corresponds to FIG. 1 in that the stroller is set up and ready for use. It should be noted that the seating area 6 could be positioned as shown in FIG. 1 or could be easily removed for transport or storage because of the use of the securing straps 122. In FIG. 10a the seating area 6 is not shown.

FIGS. 10a-f illustrate the sequence of manipulation of the frame to move the frame into position into for transport or storage as shown in FIG. 10f.

FIG. 10b shows, first of all, that the connection between brackets 40 and ends 74 is broken and the supporting frame member 66 is pivoted into a generally horizontal position so that the lower crossmember 28 may be grasped.

FIG. 10c shows that the lower crossmember 28, and the stub axles 112, 114 therein, may be lifted or raised vertically while the supporting frame member 66 is pivoted into a generally vertical position.

FIG. 10d shows that the front wheel 102 then may be moved rearwardly and that the rear wheels 104 may be moved forwardly. Thus, the frame member 60 is being moved toward the bottom or ground facing portion of the lower frame portion 16.

In FIG. 10e the folding of the frame 4 has been completed and the stroller may be easily picked up and transported or stored. It should be appreciated that by folding or everting the frame 4 of the stroller 2 in this fashion, a minimum of valuable storage or transport space will be used.

FIG. 10f shows an additional advantage of the stroller 2 of the present invention. Because the stub axles 112, 114 on which the rear wheels 104 are mounted are removably received in the lower crossmember 28, the wheels 104 may be removed for transport and storage whereby the stroller 2 will occupy even less space. Additionally, the front wheel 102 may be removed as well.

After moving the stroller 2 to the desired location, the stroller 2 may be set up for carrying an infant by simply reversing the procedures outlined in FIGS. 10a-f. That is, the lower crossmember 28 may be grasped and raised, thereby moving the rear wheels 104 to the position shown in FIG. 10d. At the same time, the supporting frame member 66 is being pivoted relative to uprights 60 and the front wheel 102 is being moved out from under. Then, as the motion continues to the position shown in FIG. 10c, the rear wheels 104 may be lowered and the supporting frame member 66 may be maneuvered into the position shown in FIG. 10b and reconnected to the lower frame portion 16 as shown in FIG. 10a.

The stroller 2 of the present invention may take different forms within the scope of the invention. In some embodiments, it may be provided with additional accessory pockets; it may be provided with a system of running lights including rear warning lights and a front headlight; as previously mentioned, a braking system may be provided; additional tie downs or connections between the seating material 120 and the frame 4 may be provided; a restraint system of a belt, belts or a harness may be provided to help securely hold an infant while the stroller 2 is being used; the angle of the handle 68 may be adjustable relative to the ground or to the support frame member 66; and the handle may be provided with a cushion grip.

It will be seen that I have provided a new and improved stroller 2 which provide a very cost effective, efficient and safe method of enabling infants and young children to accompany adults while the adults are engaged in walking, running or jogging. Additionally, my invention provides for the efficient use of storage and transport space and it may be easily manipulated into configurations for use or for transport and storage.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A conveniently transportable infant stroller for safely and smoothly carrying an infant at walking speeds and at a relatively higher speed than the normal average walking speed of approximately 3-4 miles per hour, said infant stroller comprising:
   a) a frame having an upper frame portion and a lower frame portion, said lower frame portion having a rear end, a front end, a ground facing side and an upper side whereby when carrying an infant, said upper frame portion extends generally upwardly and away from the upper side of said lower frame portion, said upper frame portion further comprising a pair of generally vertical uprights having a first end and a distal end, said uprights pivotally attached at the first end near the rear end of the lower frame portion and extending upwardly away therefrom; a U-shaped upper support member having free ends and sides extending from the free ends; wherein the free ends are removably attachable to the lower frame portion, the sides extending generally upwardly from and rearwardly toward and past the rear end of the lower frame portion to form said U-shape; means for pivotally connecting said distal ends of the uprights to the upper support member; whereby, after the infant is removed from the stroller, the free ends may be detached from the lower frame portion and the upper frame portion may be pivoted into contact with the ground facing side of the lower frame portion;
   b) a flexible infant holder removably attached to the frame;
   c) a pair of large diameter ground contacting wheels connected to the frame proximate said pivotal connection of said uprights near the rear end; and
   d) a single large diameter wheel connected to said lower frame portion front end.

2. The stroller according to claim 1, wherein the lower frame portion further comprises a pair of generally co-planar continuous side rails having a medial portion and a first end portion and a second end portion, the side rails being generally parallel at said first end portion and angled toward each other at said medial portion, said side rails being connected by at least one crossmember extending therebetween and in the same plane.

3. The stroller according to claim 2, wherein a generally planar plate is provided between the side rails at said medial portion.

4. The stroller according to claim 1, wherein the infant holder further comprises a seating area made from a flexible fabric-like material, said infant holder being suspended from and attached to the upper frame portion.

5. An infant stroller, comprising:
a) a collapsible frame having a rear end, a front end, an upper frame portion and a lower frame portion, said lower frame portion having a generally tubular crossmember positioned across said rear frame end and having two converging members at said front end; said upper frame portion having two rear support members extending upwardly from said tubular crossmember and having two front support members extending upwardly from said lower frame portion rearwardly of said two converging members; and a plate affixed between said two converging members and forwardly of said two front support members;
b) a flexible material means removably attached to said upper frame portion for supporting an infant;
c) three large diameter wheels attached to the lower frame portion in a tricycle configuration wherein a single front wheel is attached between the two converging members near the front of the lower frame portion and a pair of rear wheels are attached to the lower frame portion at opposite sides near the rear thereof, and further wherein each one of said two rear wheels is mounted on a separate stub axle, said stub axles being removably and slidably received in said generally tubular crossmember; and
d) means for pivotally connecting said upper frame rear support members to said lower frame portion, and means for detachably connecting said upper frame front support members to said lower frame portion; whereby said upper frame portion may be pivotally collapsed against said lower frame portion.

6. The stroller of claim 5, wherein said stub axles and said crossmember each have a plurality of in-line apertures, said apertures being alignable for receiving attachment means for securing said stub axles in a fixed position relative to said crossmember.

7. The stroller of claim 6, wherein each of the stub axles have a visual indicator thereon near where the wheel is attached, said indicator showing when said apertures in the axles and in the crossmember are in alignment.

8. The stroller of claim 7, further comprising a fender attached at the front end of the frame.

9. A lightweight infant stroller comprising:
a) a frame, having a front and a rear, said frame being foldable for storage and erectable for use;
b) three large diameter ground contacting wheels attached to the frame in a tricycle configuration wherein a single front wheel is attached near the front of the frame and two wheels are attached on opposite sides near the rear of the frame;
c) a flexible infant receiving holder supported by said frame, said infant holder being formed from a flexible fabric material and further comprising an inside back portion, an inside seat portion, and a lower kick portion, and further wherein said infant holder has side panels connected to the seat and to the back and further wherein said side panels have laterally extending portions;
d) a removable sunshade attached to the frame above the infant holder, the sunshade having a selectively openable access port, said port being closable completely or partially by a flap secured to said sunshade by a hook and loop fabric strip.

10. The stroller of claim 9, wherein said infant stroller further comprises a rear carryall pocket.

11. A collapsible infant stroller having a foldable frame, comprising:
a) said frame having an upper frame portion and a lower frame portion, said lower portion having spaced apart side members extending from a rear end and converging to form a relatively closer spaced apart front end, and a tubular crossmember extending between said side members proximate said rear end;
b) said frame upper portion having a pair of spaced apart upright members respectively pivotally connected to said lower frame side members proximate said rear end, and having a generally U-shaped support member with spaced apart legs, each of said legs having a free end removably attachable to a side member of said lower frame portion, and having a guard bracket extending outwardly away from the leg;
c) means for pivotally attaching each of said spaced apart upright members to a leg of said U-shaped support member;
d) a flexible infant holder attached to said guard brackets and positioned between the legs of said U-shaped support member;
e) a par of wheels, each respectively attached to an axle section, said axle sections being insertable into said tubular cross member; and means for locking each of said axle sections into said tubular cross member; and
f) a single wheel mounted between said lower frame side members at said front end.

* * * * *